United States Patent [19]
Feufel

[11] Patent Number: 5,791,836
[45] Date of Patent: Aug. 11, 1998

[54] TOOL HEAD WITH EXTERNAL CURRENT SUPPLY

[75] Inventor: Thomas Feufel, Loechgau, Germany

[73] Assignee: Komet Praezisionswerkzeuge Robert Breuning GmbH, Besigheim, Germany

[21] Appl. No.: 617,743

[22] PCT Filed: Jul. 13, 1994

[86] PCT No.: PCT/EP94/02303

§ 371 Date: Mar. 11, 1996

§ 102(e) Date: Mar. 11, 1996

[87] PCT Pub. No.: WO95/07792

PCT Pub. Date: Mar. 23, 1995

[30] Foreign Application Priority Data

Sep. 13, 1993 [DE] Germany ............... 43 30 820.1

[51] Int. Cl.[6] .................................................. B23C 1/00
[52] U.S. Cl. ........................ 408/124; 408/238; 409/136
[58] Field of Search .................................. 408/124, 125, 408/238, 239 A; 409/136, 231

[56] References Cited

U.S. PATENT DOCUMENTS

| | | | |
|---|---|---|---|
| 4,761,101 | 8/1988 | Zettl | 408/6 |
| 5,009,554 | 4/1991 | Kameyama et al. | 409/231 |
| 5,193,953 | 3/1993 | Jesinger | 409/231 |
| 5,350,263 | 9/1994 | Fedeli | 409/231 |

FOREIGN PATENT DOCUMENTS

| | | |
|---|---|---|
| 0 229 399 | 7/1990 | European Pat. Off. . |
| 2 221 371 | 4/1974 | Germany . |
| 24 19 081 | 11/1975 | Germany . |
| 24 09 043 | 1/1979 | Germany . |
| 35 12 824 A1 | 10/1986 | Germany . |
| 28 54 199 C2 | 7/1987 | Germany . |
| 37 20 746 C2 | 5/1990 | Germany . |
| 40 31 466 C1 | 11/1991 | Germany . |
| 38 17 951 C2 | 6/1992 | Germany . |
| 41 29 057 A1 | 3/1993 | Germany . |
| 1 403 113 | 6/1988 | U.S.S.R. . |

*Primary Examiner*—A. L. Pitts
*Assistant Examiner*—Henry W. H. Tsai
*Attorney, Agent, or Firm*—Flynn, Thiel, Boutell & Tanis, P.C.

[57] ABSTRACT

A tool head (10) for use in machine-tools has a base body (11), a tool shaft (20) that axially projects on the base body (11) and may be coupled to a machine spindle (22) that rotates in a stator (24) on the machine side, at least one current consumer on the side of the tool head and an external current supply arrangement (18) for the current consumer. The current supply arrangement (18) has an inductive current transmission section with a primary coil arranged in a housing (34) on the machine side and a secondary coil arranged in a housing (26) on the side of the tool head that surrounds the tool shaft (20) like a ring. In order to mount the inductive current transmission section (26, 34) in a particularly easy manner, even at a later date, without forming a disturbing contour while allowing tools to be automatically exchanged, the coil housing (34) on the machine side engages on the stator side a free axial space between the machine spindle (22) and the tool head (10) that surrounds the tool shaft (20) like a ring, that partially surrounds only segments of the tool shaft (20) in the circumferential direction, leaving a free space (43) for radial access to the tool shaft (20), and that is separated from the coil housing (34) on the side of the tool head by an axial air gap (35).

13 Claims, 5 Drawing Sheets

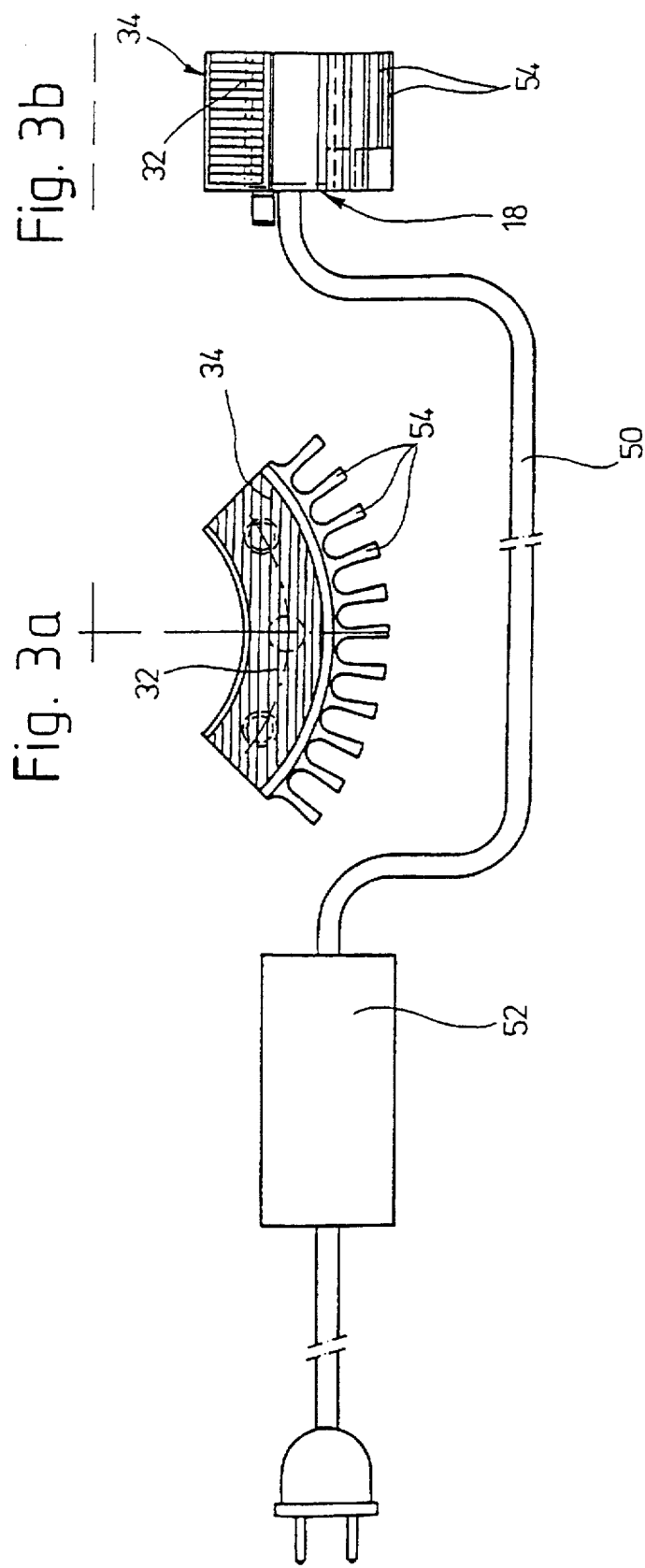

TOOL HEAD WITH EXTERNAL CURRENT SUPPLY

FIELD OF THE INVENTION

The invention relates to a tool head for use in machine tools, comprising a base body, a tool shaft which protrudes axially over the base body and which is removably coupled to a machine spindle which rotates in a stator positioned at the machine side, at least one power consumer which is preferably formed to be an adjusting motor for a slider positioned in the base body and/or measuring electronics, and an external power supply device for the power consumer, wherein the power supply device has an inductive current transfer path having a primary coil positioned in a coil housing located on the machine side, and a secondary coil positioned in a coil housing located on the tool side and which encloses the tool shaft in a ring-like manner, and wherein the two coil housings are separated from each other by a small air gap when the tool shaft is coupled to the machine spindle.

BACKGROUND OF THE INVENTION

A tool head of this type is known from EP-B-0 229 399. In this tool head the coil casing which is located at the machine side is integrated in the tool holder of the rotating machine spindle and the coil housing which is located at the tool head side is integrated in the tool shaft such that they are separated from each other in the coupled state by an essentially radial air gap. In this arrangement the complicated construction which has an additional electric rotary transmission lead through between the machine spindle and the machine stator is considered to be disadvantageous. Further, the arrangement of the two coils in the immediate area of coupling within the tool holder is susceptible to disturbances.

SUMMARY OF THE INVENTION

Starting from this, it is the object of the invention to improve the tool head of the type described above such that the inductive current transfer path may be mounted—also retrofitted—in a simple manner without the presence interfering contours and still enabling an automatic change of tools.

This object is solved by the combination of features stated in patent claim 1. Advantageous embodiments and further developments of the invention result from the dependent claims.

The solution according to the invention is based on the idea that the coil housing, which is located on the machine side, extends on the stator side into a free axial space between the machine spindle and the tool head, the space surrounds the tool shaft in a ring-like manner, such that the coil housing embraces the tool shaft only partially in a segment-like fashion in the circumferential direction while leaving a clearance zone in order to enable the radial access to the tool shaft, and that the coil housing is separated from the coil housing, which is positioned on the tool head side, by an axial air gap. These measures ensure that no interfering contours exist which extend radially beyond the tool head so as to limit the movement of the tool head.

Advantageously, the coil housing, which is located on the stator side, surrounds the tool shaft only over an angle of 50° to 100°, so that sufficient free space for the radial access by a tool holder, which can be introduced from the side opposing the coil housing at the stator side, remains. To this end, the tool shaft may be provided with a clamp groove radially accessible through the clearance zone.

In order to enable an optimal setting of the air gap within compensating tolerances, it is suggested according to an advantageous embodiment of the invention that the coil housing which is positioned on the stator side be adjustable with respect to the stator axially and/or in its rotational position about an axis which is parallel to the tool axis.

In order to facilitate the removal of heat generated by the rate of transferred power, the coil housing preferably consisting of metal, such as aluminum, has cooling fins which preferably protrude radially.

In order to make the air gap between the primary and secondary coils as small as possible, the coil housings are open at their face areas which face each other in the axial direction through the air gap, while the primary and secondary coils are embedded in a cast material consisting of plastic or resin, which is set into the corresponding coil housing and which is mechanically resilient. Additionally, primary or secondary electronics connected to the primary or secondary coil are preferably arranged in the coil housing at the stator and/or tool head side in order to condition and/or stabilize the current.

In an especially advantageous embodiment of the invention, the tool shaft and the coil housing at the tool head side are removably fastened axially in a shaft holder of the base body by way of a common central bolt. In this manner it is possible, depending on the coupling system used, to provide one and the same tool head with differently fashioned tool shafts and to simultaneously fasten the coil housing which is located at the tool head side to the base body. In order to ensure a sufficient torque transfer the tool head is additionally anchored in the base body by at least one locating pin which is positioned eccentrically with respect to the central bolt. Furthermore, the coil housing at the tool head side is additionally anchored in the base body by at least one locating pin which is positioned eccentrically with respect to the central bolt.

The arrangement according to the invention of the coil casing for the inductive current transfer also enables a retrofitting on the machine side. To this end, there is preferably provided a holder for receiving the coil housing at the stator side, the holder being removably located on the stator, and adjustable axially and in its rotational position.

BRIEF DESCRIPTION OF THE DRAWINGS

The following invention is further described with the aid of an embodiment schematically shown in the drawings. In the drawings:

FIGS. 3a and 3b show a top view and a side view of the coil housing at the stator side;

DETAILED DESCRIPTION

Figure 1A:
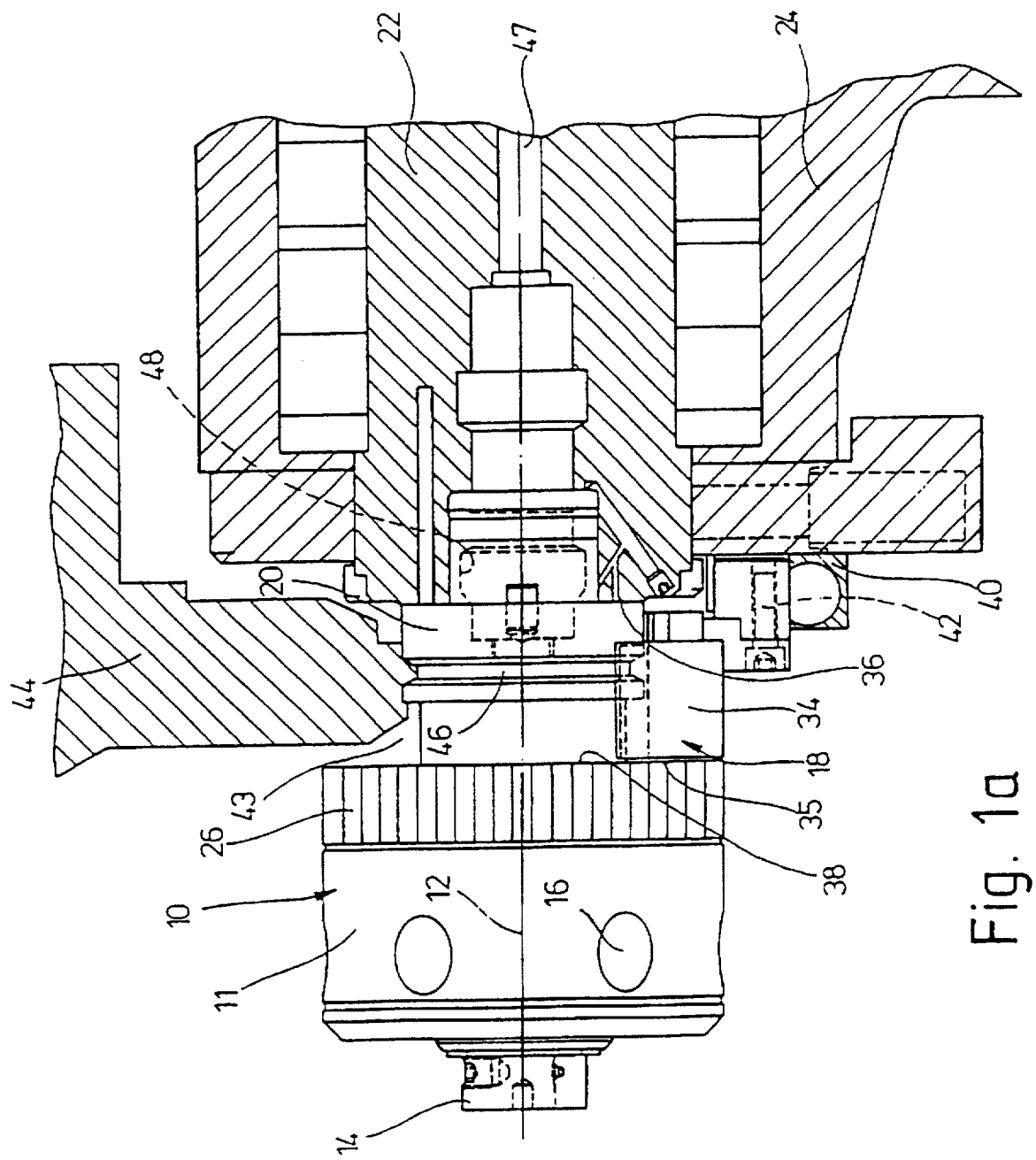
FIG. 1a shows a side view of a precision turning head mounted on a machine spindle and having an adjusting mechanism, an external current supply, and a tool holder.
Figure 1B:
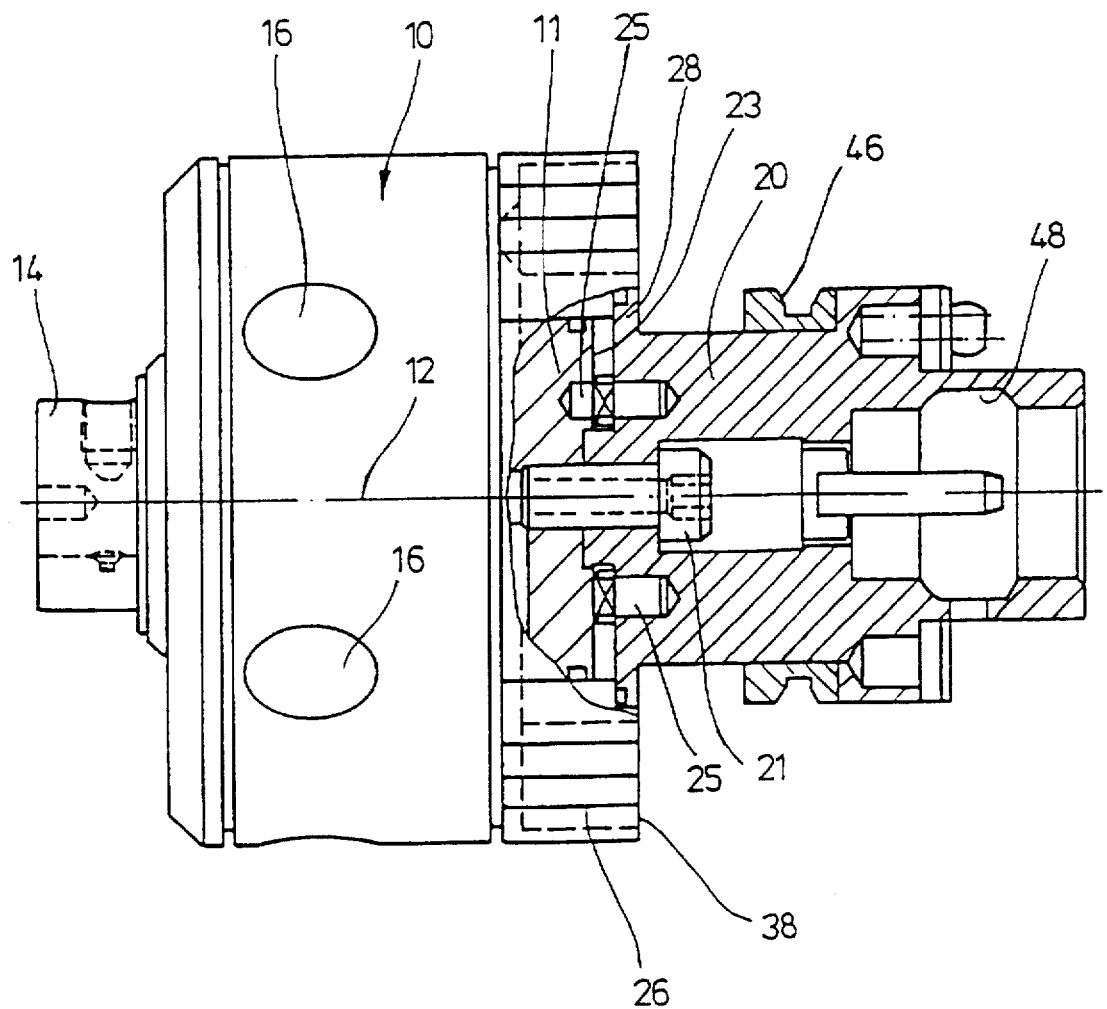
FIG. 1b shows the precision turning head in a partially cut, enlarged representation.

The tool head 10 shown in the drawings is a precision turning head and essentially consists of a base body 11, a slider adjustable perpendicularly to the axis of rotation 12 of the tool head 10 with respect to the base body 11 and which carries a tool holding fixture 14 for a cutting tool, at least one power consumer positioned within the tool head 10 in the form of a measuring device for directly measuring the distance of adjustment, an electric adjusting motor for the slider 14 and optoelectronic transceiver 16 for the data exchange, as well as a power supply device 18 and a tool shaft 20 which protrudes axially over the base body 11, the tool shaft 20 being removably coupled to a machine spindle 22 of a machine tool 24.

The tool shaft 20 is axially mounted on the base body 11 in a tool holder 23 by way of a single central bolt 21. The eccentrically positioned locating pins 25 serve to prevent rotary movement of the parts with respect to each other and also to transfer torque.

On the side of the tool shaft 20 there is additionally provided a ring-shaped coil housing 26, which is fixed to the base body 11 together with the tool shaft 20 via the collar 28 of the tool shaft by way of the central bolt 21. Rotary movement of the coil housing 26 is prevented by driving pins 30, which are formed by countersunk bolts and the shafts of which are engaged in corresponding bore holes of the base body.

A secondary coil with accompanying stabilization electronics is embedded in a mechanically resilient casting material 31 consisting of plastic or resin and is located in the coil housing 26, the secondary coil being part of an inductive transfer path of the power supply device 18 and further being connected to the power consumers at the tool head side by way of the cables 33.

The primary coil of the inductive transfer path is embedded together with the affiliated current conditioning electronics in a casting material 32 and located in a coil housing 34 on the stator side, which extends radially beyond the tool shaft 20 into the free axial gap between the face 36 of the machine spindle 22 and the free face 38 of the coil housing 26 on the tool head side. The electronics which are positioned on the primary side are connected to a main supplied external switching power supply 52 by way of the cable 50 (FIG. 3b). The cooling fins 54 protruding radially beyond the coil housing 34 ensure that the waste heat generated during high power demands is dissipated and that overheating phenomena are therefore avoided (FIG. 3a).

Figure 2:
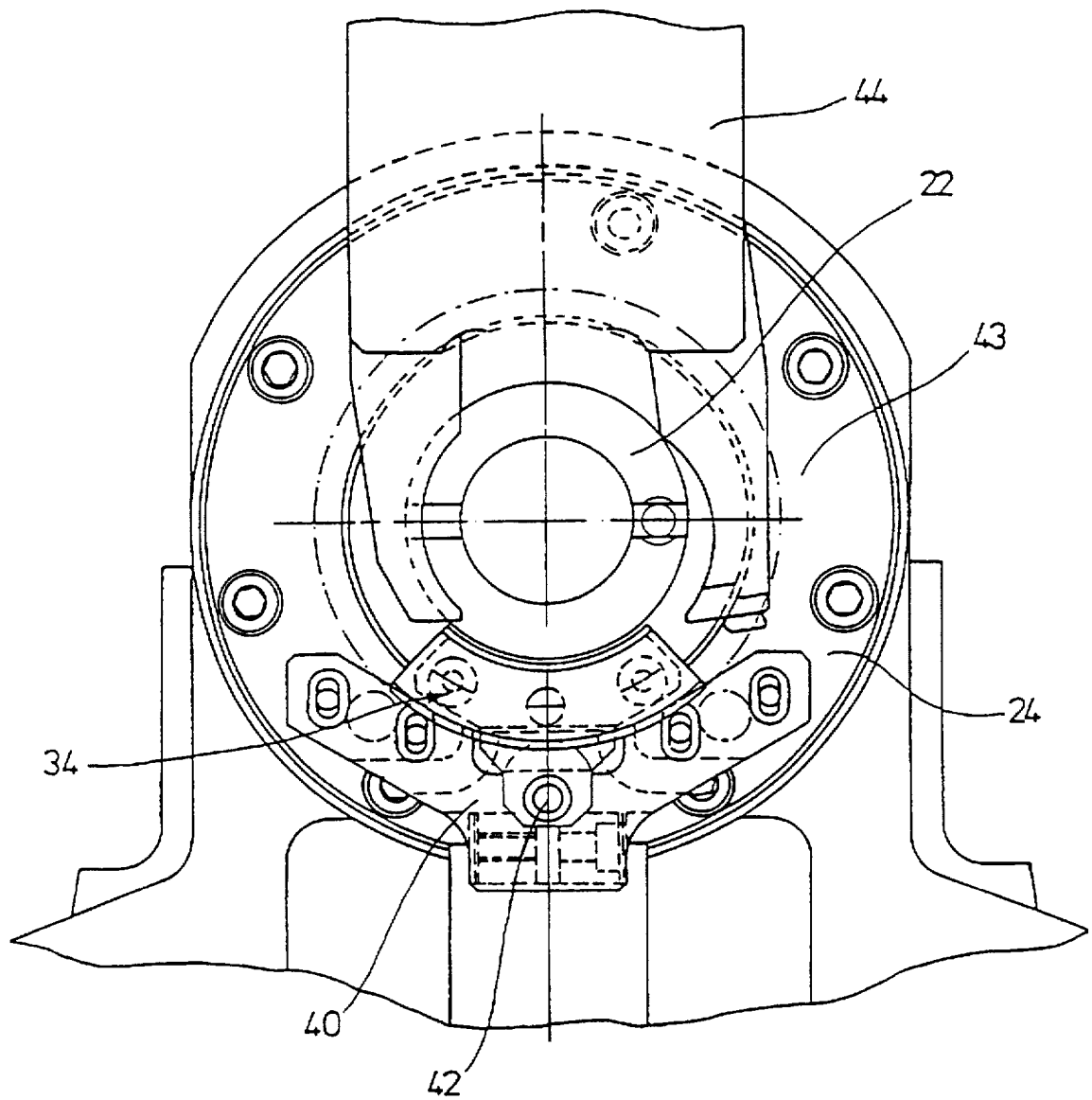
FIG. 2 shows a front face view of the tool holding fixture according to FIGS. 1a and 1b with the tool holder in an exchange position.
Figure 4B:
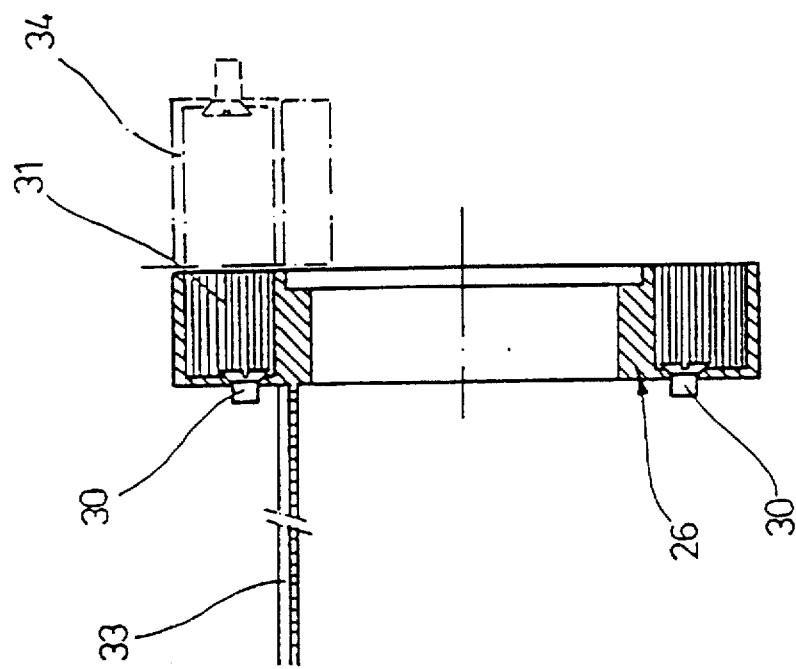
FIGS. 4a and 4b show a top view and a vertical 14 cut view through the coil housing on the tool head side view.
Figure 4A:
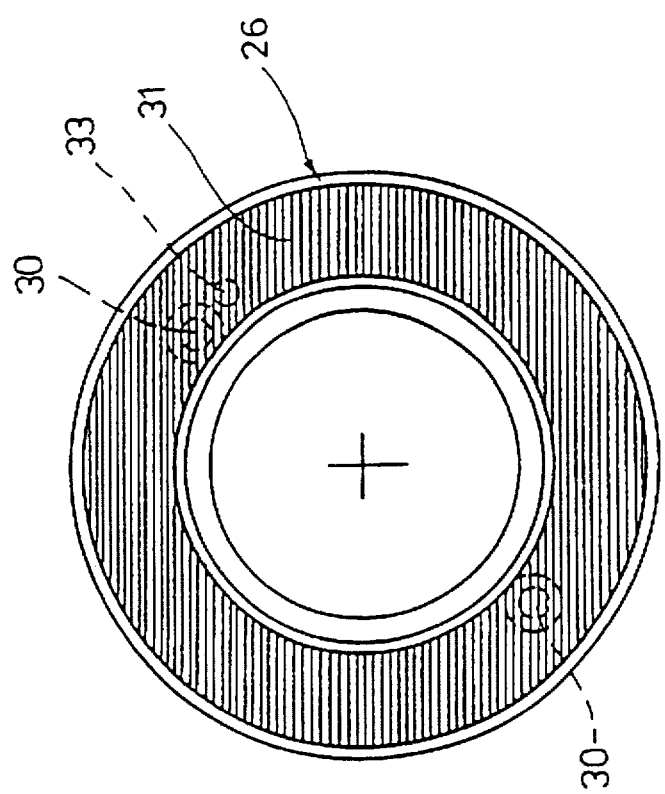

In order to be able to set the air gap 35 between the primary and secondary coils, the coil housing 34 on the stator side is located on a holder 40, which is connected to the stator by way of an adjusting mechanism and is thereby adjustable in its distance to the coil housing 26 on the tool head side as well as in its position of rotation about an axis which is parallel to the axis of rotation 12. The holder 40 with the coil housing 26 may also be retrofitted to an already existing machine tool. The coil housing 34 at the stator side extends in a segment-like fashion only over a partial circumference of approximately 70° the tool shaft 20 and leaves the major part of the circumference of the shaft free for access by a tool holder 44 for the automatic changing of tools by forming a clearance zone 43 (FIG. 2). During the changing of tools, the tool head 10 is engaged at the clamp groove 46 by the tool holder 44 from the side opposing the coil housing 26 on the stator side and moved axially with respect to the machine spindle 22 when the tool coupling is disengaged.

The coupling of the tool head 10 to the machine spindle 22 is effected by a clamping mechanism actuatable at the machine side by way of the connecting rod 47, the clamping mechanism meshing with the hollow space 48 of the tool shaft 20 from the machine side and coupling the tool head 10 to the machine spindle 22 while creating a tension in the plane faces and a radial tension.

In summary, the following is to be stated: The invention relates to a tool head 10 for use in machine tools, comprising a base body 11, a tool shaft 20 which protrudes axially over the base body 11 and which is removable coupled to a machine spindle 22 which rotates in a stator 24 positioned on the machine side, at least one power consumer on the tool head side and an external power supply device 18 for the power consumer. The power supply device 18 has an inductive current transfer path having a primary coil positioned in a coil housing 34 located on the machine side and a secondary coil positioned in a coil housing 26 located on the tool side and which encloses the tool shaft 20 in a ring-like manner. In order to be able to easily retrofit the inductive current transfer path 26, 34 without the formation of interfering contours and to still enable an automatic exchange of tools, it is suggested according to the invention that the coil housing 34, which is located on the machine side, extend on the stator side into a free axial space between the machine spindle 22 and the tool head 10, the space surrounding the tool shaft 20 in a ring-like manner, that the coil housing 34 embrace the tool shafts 20 only partially in a segment-like fashion in the circumferential direction while leaving a clearance zone 43 in order to enable radial access to the tool shaft 20, and that the coil housing 34 is separated from the coil housing 26 which is positioned at the tool head side by an axial air gap 35.

The embodiments of the invention in which an exclusive property or privilege is claimed are defined as follows:

1. In a machining tool having a machine spindle rotating in a stator and defining a machine side and a tool side, an external power supply device and a tool head removably coupled to the machine spindle providing an axial space between the tool head and the machine spindle, the tool head comprising a base body, a tool shaft protruding axially over the base body and removably coupled to the machine spindle, at least one power consumer being at least one of an adjusting motor for a slider positioned in the base body and measuring electronics, and the external power supply supplying power to the power consumer, the power supply device having an inductive current transfer path including a machine side coil housing connected to the stator, a primary coil positioned in the machine side coil housing, a tool side coil housing connected to the base body, and a secondary coil positioned in the tool side coil housing, the tool side coil housing enclosing the tool shaft in a ring-like manner, the machine side coil housing extending into the axial space between the machine spindle and the tool head, the axial space surrounding the tool shaft in a ring-like manner, the machine side coil housing encircling the tool shaft only partially in a segment-like fashion in a circumferential direction providing a clearance zone to enable radial access to the tool shaft, and an axial air gap separating the machine side coil housing from the tool side coil housing.

2. The tool head according to claim 1, wherein the tool shaft has a clamp groove radially accessible through the clearance zone.

3. The tool head according to claim 1, wherein the tool shaft defines a tool axis, and wherein the machine side coil housing is adjustable with respect to the stator to adjust at least one of the air gap and rotational position of the machine side coil housing about an axis parallel to the tool axis.

4. The tool head according to claim 1, wherein the machine side coil housing has cooling fins protruding radially.

5. The tool head according to claim 1, wherein the tool side and machine side coil housings are open at their face areas facing each other in the axial direction across the air, and wherein the primary and secondary coils are embedded in a cast material consisting of at least one of a plastic and resin, the cast material is set into the corresponding one of the tool side and machine side coil housings and is mechanically resilient.

6. The tool head according to claim 1, wherein at least one of primary and secondary electronics is connected to the respective primary and secondary coil arranged in the respective coil housing so as to condition or stabilize current.

7. The tool head according to claim 1, wherein the base body has a shaft holder, and a central bolt removably axially fastens the tool shaft and the tool side coil housing in the shaft holder.

8. The tool head according to claim 7, wherein at least one locating pin is positioned eccentrically with respect to the central bolt and anchors the tool shaft in the base body.

9. The tool head according to claim 7, wherein at least one locating pin is positioned eccentrically with respect to the central bolt and anchors the tool side coil housing in the base body.

10. The tool head according to claim 1, wherein a holder for receiving the machine side coil housing is removably located on the stator and is adjustable axially and in its rotational position.

11. In a machining tool having a spindle mounted in a stator, a first coil housing having a first coil therein for inductively transmitting electrical power mounted on the stator, and a tool head, the first coil housing extending axially from the stator, the tool head comprising a body, a tool shaft mounted in and extending from the body, the tool shaft being removably coupled to the spindle and defining a gap between the body and the stator, an electrical power consuming device mounted to the body, and a second coil housing mounted to the body in the gap and encircling the tool shaft, the second coil housing having a second coil therein for inductively transferring electrical power, the first coil housing partly radially covering the tool shaft so as to allow radial access to the tool shaft through a segment of the gap unoccupied by the first coil housing, and the first coil housing being spaced from the second coil housing when the tool shaft is coupled to the spindle.

12. The combination according to claim 11, wherein the stator has means for axially adjusting the first coil housing to control spacial separation of the first coil housing from the second coil housing and means for circumferentially positioning the first coil housing about the tool shaft.

13. The combination according to claim 12, wherein the first and second coil housings have open adjacent faces facing each other, the first and second coils are embedded in a resilient cast material, and the first coil housing has radially extending cooling fins.

* * * * *

UNITED STATES PATENT AND TRADEMARK OFFICE
CERTIFICATE OF CORRECTION

PATENT NO. : 5 791 836
DATED : August 11, 1998
INVENTOR(S) : Thomas FEUFEL

It is certified that error appears in the above-indentified patent and that said Letters Patent is hereby corrected as shown below:

Column 4, line 43; after "supply" insert ---device---.

Column 5, line 6; after "air" insert ---gap---.

Signed and Sealed this

Eighth Day of December, 1998

Attest:

BRUCE LEHMAN

Attesting Officer

Commissioner of Patents and Trademarks